3,501,558
METHOD OF MANUFACTURING COHERENT BODIES OF FOAMED SYNTHETIC PLASTIC MATERIAL

Carl Georg Munters, Stocksund, and Nils Gunnar Sjöberg, Goteborg, Sweden, assignors to W.M.B. International AB, Stockholm, Sweden, a corporation of Sweden
Continuation of application Ser. No. 319,059, Oct. 25, 1963. This application Apr. 16, 1968, Ser. No. 721,873
Claims priority, application Sweden, Nov. 1, 1962, 11,743/62
Int. Cl. B29h 7/20; B29j 5/00
U.S. Cl. 264—47                    10 Claims

ABSTRACT OF THE DISCLOSURE

A method of producing coherent bodies of foamed synthetic plastic material wherein separate compact granules of polystyrene, containing an expanding agent, are expanded in a series of steps to equalize the pressure differences within the particles. The expansion is continued until the separate granules are completely expanded and substantially all expanding agent has escaped, the granules in loose mass having a weight per unit volume substantially less than the desired density of the final coherent body. The surface of said separate expanded granules is then rendered adhesive, the mass is compacted to a final density wherein the interspaces are substantially filled without the said granules collapsing and becoming soft, and setting of the mass then forms the final coherent body.

---

Figure 1:
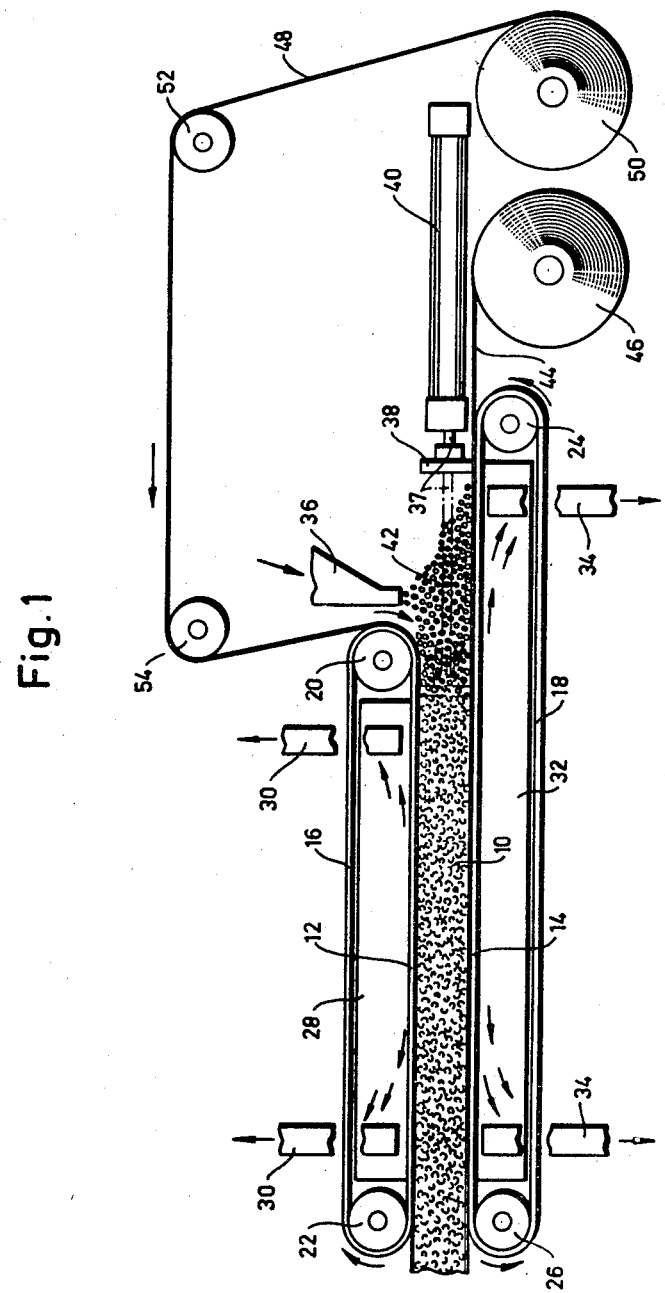

This application is a continuation of our earlier filed application Ser. No. 319,059, filed Oct. 25, 1963, now abandoned.

This invention relates to a method of producing coherent bodies of foamed synthetic plastic material by preexpanding granules of the plastic material containing a blowing or expanding agent and utilizing part of the expanding power of this agent. In a known process the cellular granules obtained by pre-expansion in this manner are placed into a mould where a second expansion of the granules is effected whereby the said granules are agglutinated into a coherent body. To the two expanding steps heat is supplied, mostly by means of steam. One example of synthetic thermoplastic material of the kind in consideration is polystyrene and the expanding agent may be constituted by petroleum ether.

One main object of the invention is to provide a process for production of such cellular plastic bodies without being dependent solely on the agglutination which occurs simultaneously with the second expanding step. This is particularly valuable when an existing hollow space, such as the interior of a wall defining a more or less irregular shape, is to be filled with a foamed body of plastic material, for example for insulating purposes. Such agglutination in the hollow space by the utilization of previously finished or expanded bodies is either not possible or is realizable only with great difficulty.

The invention may also to advantage be applied to such cases where the production of the cellular body is made in continuously operating machines or in stationary moulds.

Another object of the invention is to provide a production process which renders a final product which is cheaper and more improved with regard to shrinking than has been possible to obtain hitherto.

As an example of the application of the invention a process shall be described in which the starting material is constituted by compact or unexpanded granules of polystyrene into which an expanding agent has been introduced. The granules are initially caused to expand by a supply of heat which in the usual manner may be steam or hot air. If desired, this proces may be carried out in an apparatus of the kind described in the copending application Ser. No. 165,481 filed Jan. 11, 1962, by Berton Oxel, of common assignee and now abandoned. The expanding process is continued until the granules are finally or completely expanded and thus all agent has escaped from them. This expansion may be carried out in two steps so that the weight per unit volume or density of the originally compact granules decreases in the first step from about 1000 to about 30 kilograms per cubic meter. After that the granules have been stabilized and the pressure differences within them have been equalized a second expansion is made to form a final product the weight per unit volume of which may be 15 kilograms per cubic meter. The granules are now cellular to a high degree but they are "dead," which means they cannot by continued heating be caused to increase their volume by themselves. Thereupon an agglutination of the completely expanded granules is made for which preferably an organic binding agent or adhesive is used.

It is particularly advantageous to pre-expand the granules to a weight per unit volume which is lower, and preferably substantially lower, than the desired weight per unit volume of the finished final product. In such cases a reduction of the weight per unit volume thus will take place when the expanded granules are united together to form the coherent body. This implies that the granules during the agglutination operation are displaced so that they more or less completely fill the interspaces between them. The first expansion step may in this alternative be driven to a density of 15 kilograms per cubic meter, for example, and after some period of stabilization, such as 24 hours, a second pre-expansion is effected down to a density of about 7–8 kilograms per cubic meter. If desired, the expansion may be carried out in three steps. The granules may be expanded to a final weight per unit volume which is about one half or between one third and two thirds of the density of the finished body. It may also be stated that the pre-expansion preferably is driven to a density of the granules which is about as much lower than the volume weight of the finished body as corresponds to the proportion of the inter spaces relative to the total density of the completely expanded granules when superimposed loosely.

Further objects and advantages of the invention will become apparent from the following description, considered in connection with the accompanying drawings, which form part of this application and which show an apparatus particularly adapted for use in the method of the invention and intended for the step of agglutination of the granules to a coherent body.

Figure 2:
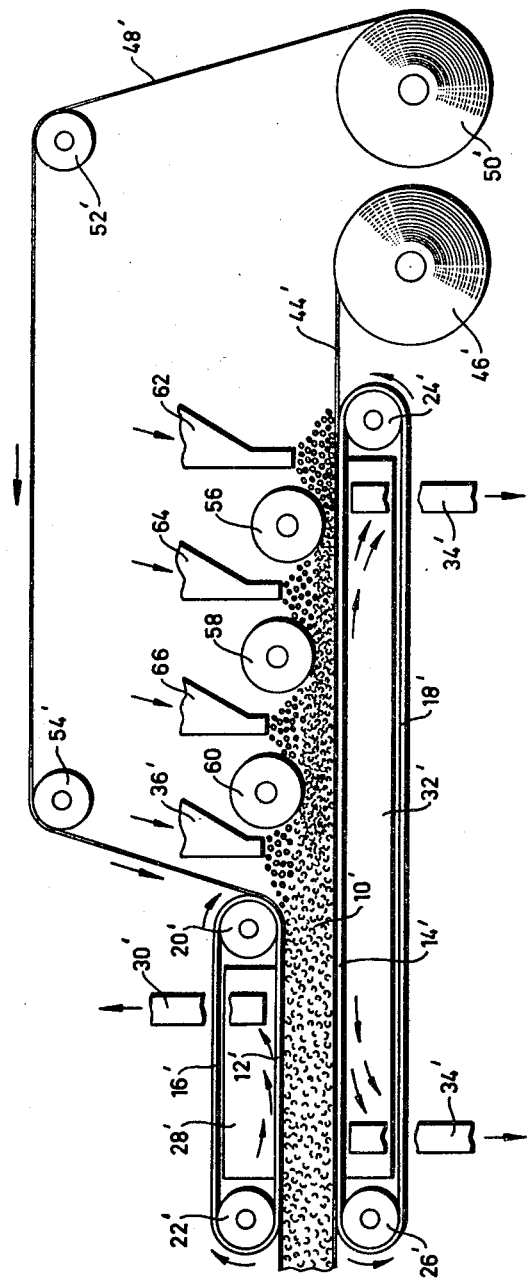
Figure 3:
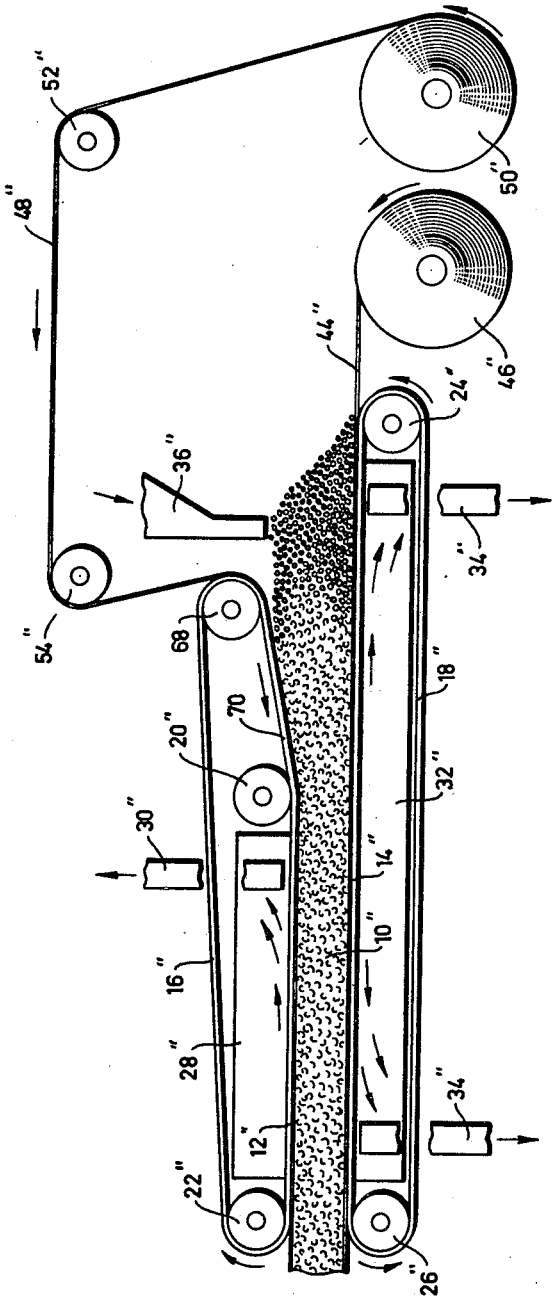

In the drawings FIGS. 1 to 3 are diagrammatic vertical longitudinal sections through machines embodying three different alternatives.

Referring to FIG. 1, reference numeral 10 denotes an elongated channel having a suitably rectangular cross section and bounded at its top by a wall 12 and at its base by a wall 14, its side being formed by two other lateral walls (not shown). In the embodiment shown in FIG. 1 the walls 12 or 14 are constituted by endless conveyor belts 16, 18 running about turning drums 20, 22 and 24, 26, respectively. Disposed within the vertical space of the opposed portions of the belt 16 is a box 28 which through conduits 30 is in connection with a vacuum source such as a suction fan (not shown). In the same manner there is disposed between the two opposed portions of the base belt 18 a box 32 within which a vacuum is produced by means of a vacuum source connected to conduits 34. When such suction boxes 28, 32 are used the belts 16, 18 are perforated.

The belt 18 extends beyond the belt 16 and there forms a feed zone which receives pre-expanded granules through a supply hopper 36. A piston 38 carried by a bar 37 is adapted under actuation of the servomotor 40 to perform a reciprocative movement over the end portion of the belt 18 so as to cause the mass of granules 42 fed onto the belt by the piston 38 to be introduced between the parts 12, 14 of the belts 16 and 18, respectively. A feeding from the hopper 36 onto the exposed zone of the belt 18 is thus effected when the piston 38 is in the position indicated by full lines. The deposited mass of granules is then forced between the belts by movement of the piston 38 to the position indicated by dotted lines, whereupon the piston returns to its full line position and depositing resumes.

Introduced into the hopper 36 are pre-expanded granules and a bonding agent or adhesive which may be dissolved in a volatile solvent. An example thereof is polyvinyl acetate dissolved in ethyl alcohol. The quantity of adhesive may amount to only a small perecent by weight of the mass of pre-expanded granules. The piston 38 advances the mass of granules by an intermittent action between the conveyor belts 16, 18, a displacement and possibly also a compression of the granules being produced simultaneously so as to cause a filling to a substantial degree of the interspace between the granules. The compression of the granules is effected in layers or increments in the direction of movement of the belts with the result that the final product attains a highly homogenous structure. The solution of adhesive adhering to the surface of the granules binds the granules together. During the continuing passage through the channel 10 a stabilization of the obtained coherent body takes place and the solvent escapes through the vacuum bodies 28, 32, the binding agent thereby attaining its full binding power.

Simultaneously, with the formation of the coherent body of pre-expanded granules, paper, canvas, plastic or metal sheets may be united with the top and/or base faces of the body. A web 44 of such material is uncoiled from a roll 46 and introduced immediately upon the upper part 14 of the belt 18 into the channel 10. Another web 48 is uncoiled from a roll 50 and is guided over pulley rolls 52, 54 into the channel 10 immediately below the part 12 of the belt 16. If a suction off of solvent or similar volatile substance is to be effected from the channel 10 through the belts 16, 18, the webs of sheet material 44, 46 are made of a material which in itself is permeable to the vapors of solvents or similar volatile materials or they are provided for this purpose with fine perforations. The webs may be connected to the porous body of plastic material by means of a particular adhesive or even with the same binding agent which agglutinates the granules. The sheet cover on the top and bottom of the porous body contributes to an increase in the mechanical strength of the body and improves the handling thereof.

It is evident that the vacuum boxes and the permeability of the conveyor belts and the cover webs, respectively, are not required if the adhesive hardens without the evaporation of solvents as is the case with many types of curable resin glues and contact glues. The boxes 28, 32 may as an alternative be used for introduction to the porous body in the channel 10 of a fluid affecting temperature, which means a heating or cooling medium. The conduits 30, 34 may both be in connection with a pressure source such as compressed air, for example, or one of them may be connected to a pressure source and the other to a vacuum source.

The embodiment shown in FIG. 2 differs from the preceding one mainly by the feature that the piston arrangement 37, 38, 40 is replaced by compressing members acting from above, such as cylindrical pressure rollers 56, 58, 60. Behind said pressure rollers, seen in the direction of advance of the granule material, there are provided feed hoppers 62, 64 and 66, respectively, for the pre-expanded granular material and the binding agent. The rollers 56, 58, 60 are in this sequence disposed with increased spacing from the base belt 18'. Granules are fed through the first hopper 62 to a level which is higher than the lowermost situated generatrix of the roller 56. Thus when the granule mass is advanced by the belt 18 towards the roller 56 a first compression of the mass of granules will take place. Thereupon a new layer is fed through the hopper 64 to a higher level than the lowermost generatrix of the roller 58. This results in that the mass now deposited also is subjected to a first compression. The same feature is repeated when a third layer of expanded granules is supplied through the hopper 66 and compressed by the roller 60. The hopper 36' finally delivers a last feed of expanded granules before the mass enters the channel 10' between the two belts 16 and 18. In this way an accumulation and compression in layers of the mass of granules is effected in parallel with the direction of movement of the mutually opposed parts of the conveyor belts. In this embodiment there is increased assurance that the final product will have the granules displaced or compressed to an altogether uniform structure.

The embodiment shown in FIG. 3 has a belt 16" which is extended past the drum 20" to a turning drum 68 which is positioned at a higher level than said drum 20" so as to form a belt part 70 converging towards the base belt 18" taken in the direction of advance of the mass of granules between the belts. In this embodiment the converging belt part 70 serves to increase the density of the mass.

When the feeding is made in an intermittent manner by means of a piston 38 or the like reciprocative member, the walls defining the channel 10 may be all or partly stationary, the pressure required for the agglutination then being produced by the friction against the wall. Such a friction pressure is, of course, produced also when movable belts are used as soon as the piston or some other intermittently acting compression member moves with greater speed than the belts.

A structure of superimposed layers of the coherent body may also be attained when the body is produced in moulds in a discontinuous manner.

The binding agent or adhesive used for the agglutination of the highly porous body of granules may be a conventional curable glue such as phenol, urea or epoxy resin. The binding agent may also be expansible in itself so as simultaneously with its binding action to form a porous filling between the expanded granules. One example of such a binding agent is urethane which is produced by bringing together two liquid components, namely isocyanate and a polyalcohol. These components react with one another so that a very porous mass is obtained which penetrates into the interspaces between the granules.

The expanding process of the binding agent can be controlled and adjusted in known manner by means of catalysts or accelerators. During the expansion of the binding agent heat is produced and it is therefore suitable to utilize a small quantity such as about 10 to 15 percent by weight of the binding agent in order to prevent the expanded granules from collapsing by becoming soft. One may, however, add a cooling agent to the mass before or during the expansion of the binding agent. Such a cooling agent may be constituted by water with which the granules are wetted. If desired, the process may be carried out in a vacuum to cause a reduction of temperature by evaporation of present water, for example.

Many times it is necessary only to unite the points of contact proper between the individual granules. The finished body may thereby be given a very low density and obtain extraordinary good insulating capacity.

The finally expanded granules of the plastic material may also be fused together by means of an electric current of high frequency. If they are wetted initially the water film on them will produce a partial heat evolution of them at the points of contact.

The granules when being united together by means of the binding agent may have their expanding power left which is particularly conceivable when the binding agent develops heat which then is utilized for the final expansion of the granules. In this case there is no supply of heat from outside required to bring the granules into their cellular state.

The expanded granules or minor pieces of the plastic material may be graduated into various groups of sizes so that the interspaces between larger granules partly are filled up by minor granules.

While several more or less specific embodiments of the invention have been shown and described, it is to be understood that this is for purpose of illustration only, and that the invention is not to be limited thereby, but its scope is to be determined by the appended claims.

What is claimed is:

1. A method of producing coherent bodies of foamed synthetic plastic material comprising the steps of:
   (a) pre-expanding separate compact granules of polystyrene, containing an expanding agent, in a series of steps, wherein each step comprises a partial expansion of said granules and a stabilization of said granules at said stage of partial expansion with equalization of the pressure differences within said particles;
   (b) continuing said pre-expansion until the separate granules are completely expanded and substantially all expanding agent has escaped from them, said granules having in a loose mass a final weight per unit volume substantially lower than the desired density of the final coherent body;
   (c) mixing said separate particles so expanded and an adhesive;
   (d) depositing said mixture and compacting it to a desired final density wherein the interspaces between the granules are substantially filled without the said granules collapsing and becoming soft; and
   (e) setting said adhesive to form the final coherent body.

2. A method as set forth in claim 1, wherein the depositing of said mixture is in a series of relatively small increments, forming succeeding layers which provide a uniform, homogenous mass.

3. A method as set forth in claim 1, wherein said adhesive includes a volatile solvent and in setting said adhesive as in step (e) a vacuum is applied to the compacted mass to draw off said solvent.

4. A method as set forth in claim 1, wherein the forming of said final coherent body is continuous, said material being deposited and compaction occurring in a series of increments to form a continuous, uniform homogenous mass.

5. A method as set forth in claim 1, wherein said adhesive is a thermoplastic adhesive and in setting said adhesive in step (e) a cooling fluid under pressure and a vacuum are applied to said body.

6. A method as set forth in claim 1, wherein said adhesive is a thermosetting adhesive and in setting said adhesive in step (e) a heating fluid under pressure and a vacuum are applied to said body.

7. A method as set forth in claim 1 wherein the adhesive of step (c) contains a volatile solvent and wherein in setting the adhesive in step (e) the said solvent is removed.

8. A method of producing coherent bodies of foamed synthetic plastic material comprising the steps of:
   (a) pre-expanding separate compact granules of polystyrene, containing an expanding agent, and continuing said pre-expansion until the separate granules are completely expanded and substantially all expanding agent has escaped from them, said granules having in a loose mass a final weight per unit volume substantially lower than the desired density of the final coherent body;
   (b) mixing said separate particles so expanded and an adhesive which contains a volatile solvent;
   (c) depositing said mixture and compacting it to a desired final density wherein the interspaces between the granules are substantially filled without the said granules collapsing and becoming soft; and
   (d) setting said adhesive to form the final coherent body by applying a vacuum to the body to draw off the volatile solvent and accelerate the forming of said final coherent body.

9. A method of producing coherent bodies of foamed synthetic plastic material comprising the steps of:
   (a) pre-expanding separate compact granules of polystyrene, containing an expanding agent, in a series of steps, wherein each step comprises a partial expansion of said granules and a stabilization of said granules at said stage of partial expansion with equalization of the pressure differences within said particles;
   (b) continuing said pre-expansion until the separate granules are completely expanded and substantially all expanding agent has escaped from them, said granules having a loose mass a final weight per unit volume substantially lower than the desired density of the final coherent body;
   (c) mixing said separate particles so expanded and an adhesive which contains a volatile solvent;
   (d) depositing said mixture between two continuous fluid permeable moving belts and compacting said mixture to a desired final density wherein the interspaces between the granules are substantially filled without the said granules collapsing and becoming soft; and
   (e) setting said adhesive to form the final coherent body while applying a vacuum to at least one face of said body through one of said moving belts to draw off said volatile solvent.

10. A method as set forth in claim 1, wherein the final weight per unit volume of step (b) is lower than the desired density of the final coherent body by an amount corresponding to the proportion of interspaces in the completely expanded loose granules prior to compaction, the compaction of step (d) thereby occurring without collapse and destruction of said granules.

References Cited

UNITED STATES PATENTS

| | | | |
|---|---|---|---|
| 3,037,897 | 6/1962 | Pelley | 264—47 XR |
| 3,086,248 | 4/1963 | Culp | 264—53 |
| 3,255,286 | 6/1966 | Luc-Belmont. | |

OTHER REFERENCES

Stastny, Fritz: BASF reprint: "New Methods for the Fabrication of Styropor," pp. 15–17, title page, sheet A (reprinted from "Derplastverarbeiter," 7, 242–250 (1955)).

PHILIP E. ANDERSON, Primary Examiner

U.S. Cl. X.R.

18—4; 264—51, 87, 109, 113